Jan. 14, 1969   O. M. ULBING   3,421,737
BALANCING HOIST

Filed June 13, 1967   Sheet 1 of 2

INVENTOR.
OTMAR M. ULBING
BY
David W. Tibbott
ATTORNEY

Jan. 14, 1969     O. M. ULBING     3,421,737
BALANCING HOIST

Filed June 13, 1967     Sheet 2 of 2

INVENTOR.
OTMAR M. ULBING
BY
David W. Tilbott
ATTORNEY

United States Patent Office 3,421,737
Patented Jan. 14, 1969

3,421,737
BALANCING HOIST
Otmar M. Ulbing, Berkshire, N.Y., assignor to Ingersoll-Rand Company, New York, N.Y., a corporation of New Jersey
Filed June 13, 1967, Ser. No. 645,644
U.S. Cl. 254—186                                    8 Claims
Int. Cl. B66d 1/08

ABSTRACT OF THE DISCLOSURE

A balancing hoist containing a fluid pressure-operated drum for balancing a suspended load and fed from a pilot-operated pressure regulator connected to an air supply and a control system containing means for automatically maintaining the pilot air pressure at a predetermined selected magnitude by throttling the pressure from the air supply and venting it to reduce the pressure to the desired pilot air pressure. The control system includes a pendant control member having a movable cup-shaped flexible valve for shifting the pilot air to a plurality of selected pressures.

Background of invention

This invention relates to a control system and mechanism for operating and controlling a balancing hoist containing a fluid pressure-operated member for balancing a load supported by the hoist. A hoist of this general type is disclosed in United States Patent No. 3,286,989 granted Nov. 22, 1966.

Summary of invention

The principal object of this invention is to provide a balancing hoist control system which is relatively simple, reliable, safe and economical to use.

Other important objects of this invention are: to provide a novel hand-operated control mechanism for operating a balance hoist; and to provide a control mechanism for a balance hoist which is relatively simple to operate.

In general, the foregoing objects are attained in a control system including an air supply, a pilot-operated pressure regulator valve receiving air from the air supply and connected to the hoist to supply a controlled air pressure to the hoist balancing mechanism and also having a pilot air port adapted to receive pilot air to control the regulator valve, a line interconnecting the air supply to the pilot air port and containing a thotttle valve and a check valve, and a control mechanism connected to the pilot air port and containing controls for selectably exhausting the pilot air to maintain the pilot air at a plurality of selected predetermined pressure magnitudes to cause said regulator valve to supply the balance hoist with a plurality of controlled air pressures.

Brief description of drawing

This invention is described in connection with the accompanying drawings wherein.

Description of preferred embodiment

Figure 1:
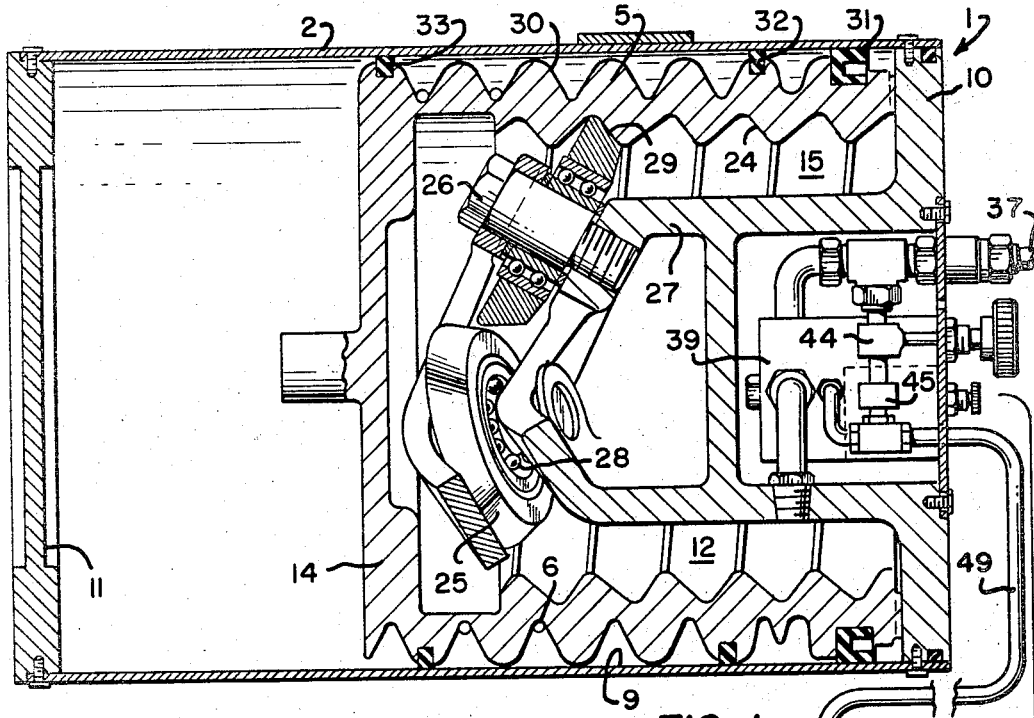
FIG. 1 is a sectional view of a balance hoist connected to a manual control member which is shown in elevation and illustrates a control system incorporating the concepts of this invention.
Figure 2:
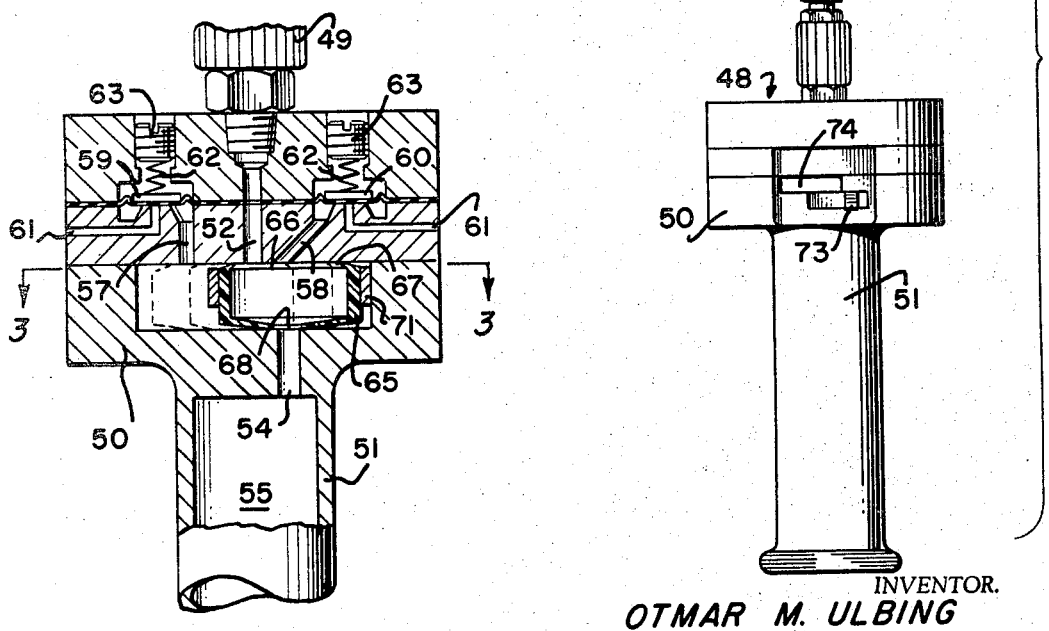
FIG. 2 is an enlarged fragmentary elevational view with portions being cut away and shown in section of the control member shown in FIG. 1.
Figure 6:
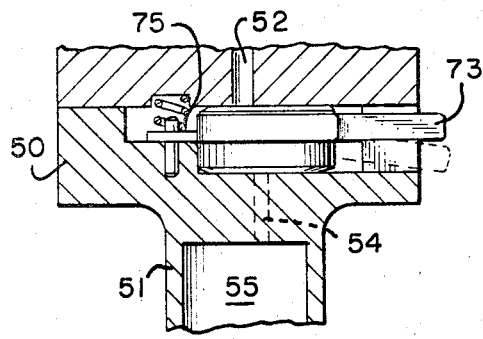
FIG. 6 is a fragmentary section taken on the line 6—6 of FIG. 4.

The balancing hoist 1 shown in FIG. 1 includes an outer casing 2 which may be supported on a suitable overhead support, a hoist drum 5 contained in the casing 2 and a hoisting cable 6 wound on the drum with a portion depending from the drum through an open slot formed in the casing 2. All of the foregoing structure is conventional in the hoist art, as shown in the U.S. Patent No. 3,286,989.

The hoist casing 2 contains an internal cylindrical bore 9 which is capped at its opposite ends by a right end wall 10 and left end wall 11. The drum 5 is mounted in the bore 9 to rotate and move axially therein. The drum 5 contains an internal cavity 12 which is closed at the left end of the drum by an end wall 14. The drum 5 cooperates with the casing 2 and the right end wall 10 of the casing 2 to form a closed air chamber 15 therebetween. It is easily seen that the introduction of pneumatic pressure into the air chamber 15 will urge the drum 5 to the left in the casing 2, as shown in FIG. 1.

The interior of the drum 5 is provided with an internal helical thread 24 engaged by a group of three rollers 25 which are pivoted on bolts 26 mounted on the inner end of a bracket 27 formed integrally on the right end wall 10 of the casing 2. The bracket 27 projects concentrically inward from the right end wall 10 in the bore 9 and is sufficiently small to fit into the cavity 12 of the drum 5. The rollers 25 include ball bearings 28 to reduce friction. The rollers 25 have tapered or conical peripheries 29 and are mounted on axes arranged at acute angles to the axis of the bore 9. The rollers 25 have a nearly pure rolling action on the surface of the thread 24, thus minimizing the sliding of the rollers 25. The rollers 25 are located near a vertical plane extending through the slot in the casing 2 so they will support the drum 5 substantially in a vertical plane extending through the slot, through which the hoist cable 6 extends. As a result, pneumatic pressure in the air chamber 15 will act to urge the drum 5 toward the left as shown in FIG. 1 and to wind up the cable 6. The helical thread 24 on the interior of the drum 5 is arranged so that the drum will wind up the hoisting cable as it moves to the left as shown in FIG. 1.

The exterior of the drum 5 includes a helical groove 30 for containing the hoisting cable 6. The helix of the groove 30 has the same direction of rotation as the thread 24. Preferably the pitch or distance between adjacent turns of the groove 30 is the same as the pitch of the helical thread 24 on the inside of the drum 5. This relationship will maintain the depending portion of the cable 6 in a stationary vertical plane as the drum 5 moves back and forth in the casing 2 during the unwinding or winding of the hoist cable 6. Since the rollers 25 support the drum near the vertical plane extending through the depending portion of the cable 6, there will be little or no force on the drum tending to tilt it in the bore 9.

The exterior of the hoist drum 5 contains a seal 31 for sealing the clearance between the drum 5 and the interior of the bore 9 to prevent leakage from the air chamber 15. The reference numbers 32 and 33 indicate bearing buttons composed of anti-friction material.

Figure 7:
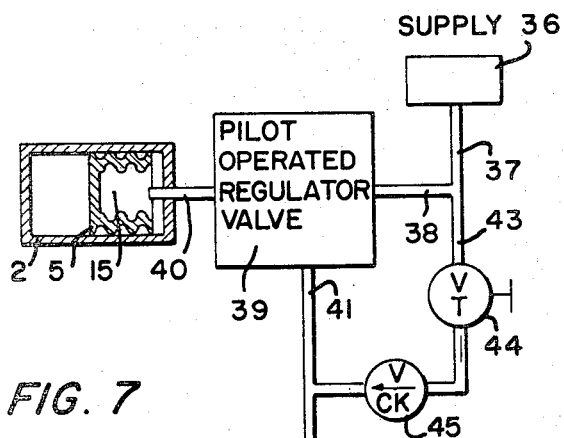
FIG. 7 is a schematic view of the control system shown in FIG. 1.

The overall system for operating the balance hoist 1 is illustrated in FIGS. 1 and 7. A suitable air supply 36 is connected by a line 37 to the inlet 38 of a pilot-operated pressure regulator 39. The regulator 39 should be able to relieve or bleed down at a high rate. The air supply 36 provides an air pressure of relatively high pressure, say 100 p.s.i. The outlet 40 of the regulator 39 is connected to the air chamber 15 of the balance hoist 1. The regulator 39 also has a pilot air port 41 adapted to receive a pilot air pressure which is normally less than the pressure of the air supply 36. The regulator 39 delivers and maintains an air pressure in the outlet 40 in accordance with the pilot air pressure applied to the port 41.

A line 43 interconnects the air supply 36 to the pilot air port 41 of the regulator 39. This line 43 contains an adjustable throttle valve 44 for throttling and reducing the air pressure flowing through the line 43. The line 43 also contains a check valve 45 for preventing any reverse flow from the pilot air port 41 to the air supply 36. Such reverse flow would normally only occur if the pressure dropped substantially in the air supply 36.

A pendant control member 48 is connected to the pilot air port 41 by an air hose 49. The pendant control member 48 vents or exhausts the air pressure at the port 41 at a controlled rate to maintain the pilot pressure at a predetermined selected value. The pendant control member 48 includes means for selecting a plurality of pilot air pressures.

The pendant control member 48 includes a body comprising a head 50 and a hand grip 51 depending from the head 50. The hose 49 is connected to an inlet passage 52 opening into a valve chamber 53 formed in the head. The floor of the valve chamber 53 is connected to an exhaust passage 54 which opens into a hollow 55 in the hand grip 51. The hollow 55 is open at the lower end of the hand grip 51, thus allowing the exhaust passage 54 to vent to the atmosphere.

The top of the valve chamber 53 includes a pair of bleed passages 57 and 58 extending to respective diaphragm valves 59 and 60. Each diaphragm valve closes and opens a vent passage 61 and includes a spring 62 and an adjusting screw 63 for varying the tension on the spring 62 to vary the pressure magnitude under which the diaphragm valve opens and closes. The operation of the diaphragm valves 59 and 60 is conventional. Hence, it is believed that it is only necessary to explain that the pressure in the bleed passages 57 and 58 is substantially balanced by the spring 62 on top of the diaphragm valve. If a balance is not present, the valve automatically opens or closes sufficiently to lower or raise the pressure until the proper balancing pressure is achieved. Normally, the screws 63 of the two diaphragm valves 59 and 60 will be adjusted to create two different balance pressures.

The valve chamber 53 contains a cup-shaped valve 65 of flexible material such as Teflon. The valve 65 has a top opening 66 surrounded by an inwardly and upwardly converging rim 67 which engages the top or ceiling of the valve chamber 53 and seals the interior of the valve 65 from its exterior. In addition, the bottom of the valve 65 resiliently engages the floor of the valve chamber 53 to seal the interior of the valve 65 from its exterior. The bottom of the valve 65 contains a small axially positioned hole 68.

Figure 3:
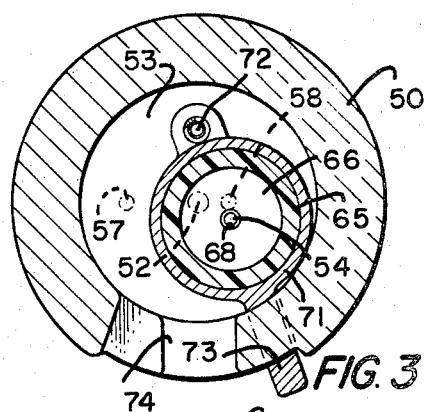
FIGS. 3 to 5 are sections taken on the line 3—3 of FIG. 2 and showing the control device of FIG. 2 in each of its three positions.
Figure 4:
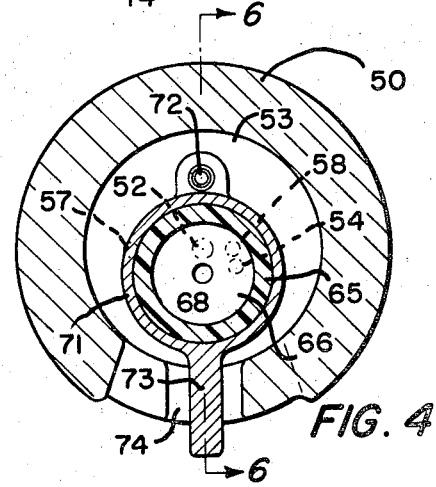
Figure 5:
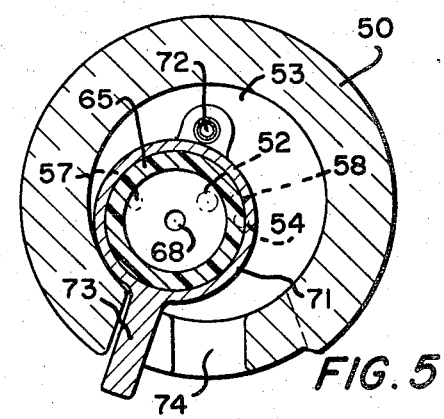

FIGS. 3 to 5 illustrate that the cup valve 65 is movable to three different positions. In FIG. 1, the valve 65 interconnects the inlet passage 52 to the exhaust passage 54 by having its bottom hole 68 aligned with the exhaust passage 54. FIGS. 3 to 5 show the passage 52, 54, 57 and 58 in dotted lines to illustrate their positions relative to the valve 65.

In FIG. 4 the valve is moved to a mid-position wherein it is no longer open to the exhaust passage 54. As a result, the inlet passage 52 is open to the bleed passage 58 whereby the diaphragm valve 60 controls the pressure in the inlet passage 52.

In FIG. 5, the cup valve 65 is moved to the third position wherein the inlet passage 52 is connected to the bleed passage 57 of the other diaphragm valve 59. In this third position, the bleed passage 58 is disconnected from the inlet passage 52.

The cup valve 65 is shifted between the foregoing positions by a ring 71 which loosely circles the cup valve 65 and is pivoted in the valve chamber 53 on a pin 72. The ring 71 includes an integral handle 73 extending from the head 50 of the pendant control 48 for pivoting the ring 71 about its pivot pin 72.

As shown in FIG. 1, the handle 73 of the valve shifter ring 71 extends through a substantially Z-shaped slot 74 which controls and allows the handle to be shifted to its three positions. A spring 75 presses down on the portion of the ring 71 pivoted on the pin 72 so that the handle 73 normally remains in the upper portion of the Z-shaped slot 74. Thus, the slot 74 prevents the handle from being accidentally moved to the full exhaust position shown in FIG. 3. In order to move the handle 73 to the FIG. 3 position, the operator must press downward on the handle 73 against the spring 75 and then shift the handle to the right in the lower leg of the Z-shaped slot 74.

Although a single embodiment of the invention is illustrated and described in detail, it should be understood that the invention is not limited merely to these embodiments, but contemplates other embodiments and variations which utilize the concepts and teachings of this invention.

What is claimed is:

1. A balancing hoist control system for operating and controlling a balance hoist having a pressure operated member for balancing the load on the hoist, said control system comprising:
   a relatively high pressure air supply;
   a pilot-operated regulator valve having a main inlet connected to said air supply, a main outlet connected to said hoist member for supplying said hoist member with a controlled air pressure, and a pilot port adapted to receive a pilot air pressure for controlling the regulator valve and causing it to supply air pressure to said hoist member in accordance with the pilot air pressure;
   a line connected from said supply to said pilot port and containing a throttle valve for throttling and reducing the air pressure from said supply to a lower air pressure flowing to said pilot port; and
   a control member adapted to be operated by hand and connected to said pilot port, said control member being operative to exhaust said pilot port to prevent the air pressure in said pilot port from rising above a predetermined pressure which is below the pressure of said supply, thereby creating a pilot pressure which corresponds to said pedetermined pressure.

2. The control system of claim 1 wherein:
   said line includes a check valve preventing air from flowing from said pilot port to said air supply in the event of failure of said air supply.

3. The control system of claim 1 wherein:
   said control member includes an adjustable diaphragm valve for exhausting said pilot port to create said pilot pressure.

4. The control system of claim 1 wherein:
   said control member includes a control movable to a plurality of selectable positions for maintaining different pilot pressures at said pilot port running from zero to a maximum pilot pressure which is less than the pressure of said air supply.

5. The control system of claim 4 wherein:
   said control includes a chamber housing a flexible member having lips resiliently urged against the walls of the chamber and movable within the chamber to interconnect various ports opening through the chamber walls.

6. The control system of claim 5 wherein:
   said flexible member is cup-shaped with an opening in its bottom adapted to be connected to an exhaust passage.

7. The control system of claim 6 wherein:
   said control member includes a hand grip portion adapted to be grasped by the operator's hand and containing said exhaust passage which opens out the bottom end of the hand grip portion.

8. The control system of claim 6 wherein:
  said cup-shaped flexible member is movable to several positions in said chamber by a handle extending from said control member; and
  said handle is spring-urged away from the position wherein said pilot air is fully exhausted by said control.

References Cited

UNITED STATES PATENTS 3,260,508   7/1966   Powell _____ 254—168

EVON C. BLUNK, *Primary Examiner.*

H. C. HORNSBY, *Assistant Examiner.*